Patented Apr. 21, 1942

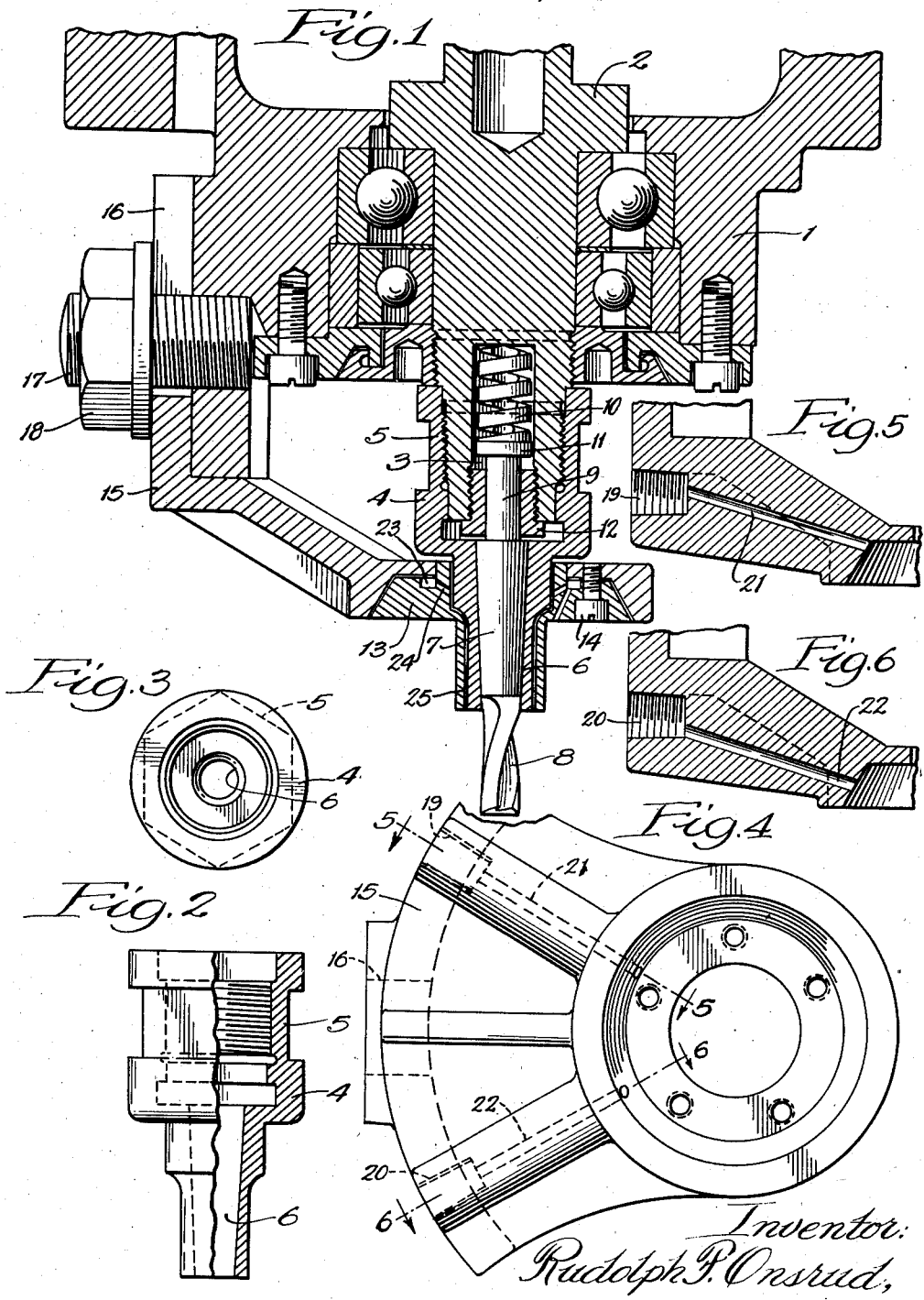

2,280,299

UNITED STATES PATENT OFFICE 2,280,299

CHUCK

Rudolph F. Onsrud, Chicago, Ill., assignor to Onsrud Machine Works, Inc., Chicago, Ill., a corporation of Illinois Application March 10, 1941, Serial No. 382,605

2 Claims. (Cl. 279—9)

This invention relates to chucks designed for attaining uniform contact and pressure between the chuck and the entire shank area of the tool received by the chuck, the purposes of the invention being to provide as nearly as possible a chuck which will keep a tool such as a router or drill truly centralized under severe working stresses, and substantially free from vibration due to resilience of gripping elements. A further purpose of the invention is to provide a solid chuck for receiving tapered shanks of bits in combination with resilient means for seating the bit in the chuck with a definite axial pressure and allowing for elongation of the bit under the normal rise in temperature thereof due to the working load thereon. It is also the purpose of the invention to provide in connection with the chuck, a pattern follower arrangement surrounding the bit end of the chuck, permitting of minimum overhang of the cutting portion of the tool from the chuck and incidentally providing for lubrication, cooling and chip removal.

The objects of the invention are accomplished by means of a construction as illustrated in the drawing, wherein:

Figure 1 is a longitudinal section partly broken away through a spindle and chuck thereon, including a showing of bearings at the chuck end of the spindle.

Fig. 2 is a detail showing an elevation, partly in section, of the one-piece body of the chuck.

Fig. 3 shows the structure of Fig. 2 in plan.

Fig. 4 is a bottom plan view of a pattern follower support.

Fig. 5 is a sectional detail taken on the line 5—5 of Fig. 4 and

Fig. 6 is a sectional detail taken on the line 6—6 of Fig. 4.

An example of work to be performed by the construction illustrated is the cutting of stacked sheets of dural or other non-ferrous metals with a routing tool, which tool is caused to follow the outline of a pattern or guide conforming to the various sheet metal parts required in fabricating parts used in the bodies and wings of airplanes. In that kind of work the maximum bit rigidity is desirable for accurate and smooth work.

Split collets and other multiple-jawed chucks have not proven entirely satisfactory. The direction of taper in this new form of tapered chuck is reversed from the taper in the customary solid chucks. The improved arrangement enables a definite seating pressure to be applied to the inner end of the tool. This seating pressure is afforded by a coiled spring operating upon a plunger which communicates the pressure to the inner end of the tool.

With the taper equaling $\frac{7}{16}$ths inch per foot and a spring pressure of 240 pounds normal on the inner end of a $\frac{1}{8}$ bit, the chuck provides eight times the gripping power necessary to twist off the bit. This gripping force is many times in excess of that provided by the conventional split collet which has, up to this time, been the preferred type of grip in the class of work for which the improved tool is designed. The split collet is objectionable due to its resiliency and consequent bit breakage. Also, the split collet does not afford proper gripping contact with the shank of the tool down to the cutting portion thereof when the tool passes through a separate follower element surrounding the shank near the cutting portion of the tool. That is, what is known as overhang, is greatly reduced. By overhang is meant the extent that the tool extends outside of the chuck.

Fig. 1 shows a router head 1 journalling a spindle 2. The lower end of the spindle is hollowed out as indicated at 3. The chuck 4 is in threaded engagement with the spindle, the portion 5 of the chuck being hexagonal for receiving a wrench. The chuck has an integral solid sleeve extension which is tapered as at 6 for receiving a conformingly tapered bit shank 7. The smaller end of the tapered socket terminates near the cutting portion 8 of the tool.

A plunger 9 bears against the inner end of the tool, forcing the tool to its seat by transmitting pressure from a spring 10 bearing against the head 11 of the plunger. The spring strength is calculated to be sufficient to lock the tool and chuck with a gripping force greater than a turning moment sufficient to break the tool, yet this spring arrangement allows for elongation of the tool upon a rise in temperature. The plunger has a sliding fit with nut 12 threaded into the end of the hollow spindle. 13 is a follower surrounding, but clear of the sleeve extension of the chuck. The follower element is attached by screws 14 to a follower support 15 which is forked at its upper end 16 to receive the threaded stud 17 extending from the router head structure 1. A clamping nut 18 fits the stud 17. The follower support is tapped at 19 and 20, Figs. 5 and 6 for receiving conduits respectively for air and oil from which, through the channels 21 and 22, the fluids are conducted to an annular channel 23 in the follower 13. Perforations 24 in the follower conduct the air and oil to the space between the follower and the sleeve extension of the chuck from which the fluids are sprayed on the cutting portion of the tool and the work operated upon.

To remove or insert a tool in the socket of the chuck it is necessary to remove the chuck from the spindle as the tool enters the chuck from the spindle receiving portion of the chuck and, of course, it is necessary to first remove the follower support 15.

In the use of this construction the router head is carried by an elbowed arm construction, enabling universal motion of the router head in a horizontal plane, so that it may be guided around a pattern clamped to the top of a stack of sheets operated upon by the router. The router head and spindle and operating motor therefor are also arranged for vertical motion, as required in the use of drills.

I claim:

1. The combination of a chuck and spindle wherein the end of the spindle is provided with a spring receiving pocket, a spring in said pocket, said spindle and chuck having threaded engagement, the chuck having an undivided outer end wherein is formed a tapered tool receiving socket in alignment with the spring pocket of the spindle, and the taper of said chuck socket being minimum at the outer end of the chuck and maximum adjacent the spindle receiving end of the chuck.

2. The combination of a chuck and spindle wherein the end of the spindle is provided with a spring receiving pocket, a spring in said pocket, said spindle and chuck having threaded engagement, the outer end of the chuck having formed therein a tapered tool receiving socket in alignment with the spring pocket of the spindle, the taper of said chuck socket being minimum at the outer end of the chuck and maximum adjacent the spindle receiving end of the chuck, and a plunger slidably received by the spindle in position to transmit thrust from the spring toward the tapered socket of the chuck.

RUDOLPH F. ONSRUD.